United States Patent [19]

Bertrand

[11] 4,230,821

[45] Oct. 28, 1980

[54] FIRE-RETARDANT POLYSTYRENIC COMPOSITIONS

[75] Inventor: Jean-Noël M. Bertrand, Wezembeek-Oppem, Belgium

[73] Assignee: Labofina, S.A., Brussels, Belgium

[21] Appl. No.: 15,399

[22] Filed: Feb. 26, 1979

[51] Int. Cl.$^2$ .................. C08K 5/02; C08K 5/03; C08K 5/34
[52] U.S. Cl. .................. 521/95; 252/8.1; 260/28.5 A; 260/28.5 B; 260/45.7 R; 260/45.75 B; 260/45.8 NT; 260/45.95 G; 521/907
[58] Field of Search .......... 260/45.7 RL, 45.8 NT; 521/907; 252/8.1

[56] References Cited

U.S. PATENT DOCUMENTS

| | | | |
|---|---|---|---|
| 3,324,076 | 6/1967 | Elder et al. | 260/45.8 NT |
| 3,817,912 | 6/1974 | Diebel et al. | 260/45.7 RL |
| 3,828,003 | 8/1974 | Yamazaki et al. | 260/45.7 RL |
| 3,830,766 | 8/1974 | Praetzel et al. | 260/45.7 RL |
| 3,959,219 | 5/1976 | Aoyama et al. | 260/45.8 NT |
| 3,975,327 | 8/1976 | Nintz et al. | 260/45.7 RL |
| 4,024,092 | 5/1977 | Sonnenberg | 260/45.7 RL |
| 4,033,916 | 7/1977 | Whelan, Jr. | 260/45.7 RL |
| 4,067,930 | 1/1978 | Versnel et al. | 260/45.7 RL |
| 4,087,399 | 5/1978 | Hamada et al. | 260/45.8 NT |
| 4,092,281 | 5/1978 | Bertrand | 260/45.7 RL |

*Primary Examiner*—Hosea E. Taylor
*Assistant Examiner*—R. A. White
*Attorney, Agent, or Firm*—Schwartz, Jeffery, Schwaab, Mack, Blumenthal & Koch

[57] ABSTRACT

Disclosed is a self-extinguishing polystyrenic composition comprising a polystyrenic resin, a fire-retardant amount of a halogenated organic fire-retardant agent and a benzotriazolic compound having the formula

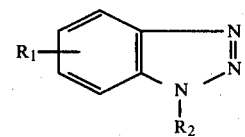

wherein $R_1$ is H or —$CH_3$ and $R_2$ is H or —$CH_2N(R_3)_2$ wherein $R_3$ is H, an alkyl radical containing from about 1 to 12 carbon atoms or —$CH_2CH_2OH$, in an amount between about 1 and 50% of the weight of said fire-retardant agent.

11 Claims, No Drawings

FIRE-RETARDANT POLYSTYRENIC COMPOSITIONS

BACKGROUND OF THE INVENTION

The present invention relates to fire-retardant polystyrenic compositions.

For many uses, fire-retardant agents must be incorporated into polystyrenic resins, such as polystyrene, styrene-acrylonitrile copolymers (known as SAN), acrylonitrile-butadiene-styrene copolymers (known as ABS resins), high impact polystyrenes and the like, to impart fire-resistance to such resins. Organic compounds containing bromine and/or chlorine are frequently employed as fire-retardant agents. However, large amounts of fire-retardant agents are often required to obtain polystyrenic compositions which fulfill specifications relating to flame propagation, and these large amounts are detrimental to other properties of the polystyrenic compositions, such as tensile strength and thermal stability.

With a view toward decreasing the amount of fire-retardant agent which must be added to such resins, the synergistic action of some additives (or synergistic compounds) which, when used alone, do not act as fire-retardant agents, has been contemplated. Organic peroxides have been suggested as synergistic compounds, but they have several drawbacks, more particularly with respect to toxicity and stability.

SUMMARY OF THE INVENTION

It is therefore an object of the present invention to provide new fire-retardant polystyrenic compositions. Another object of the invention is to provide new fire-retardant polystyrenic compositions comprising a polystyrenic resin, a halogenated organic fire-retardant agent and a new synergistic compound. A further object of the present invention resides in providing polystyrenic compositions which obviate the above-mentioned drawbacks.

Still another object of the invention is to provide new synergistic compounds which are very active.

In accomplishing the foregoing objects, there has been provided according to one embodiment of the present invention a polystyrenic composition comprising a polystyrenic polymer, a halogenated organic fire-retardant agent and a benzotriazolic compound having the formula

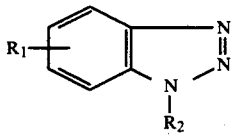

wherein $R_1$ is H or $-CH_3$ and $R_2$ is H or $-CH_2 N(R_3)_2$ with $R_3$ being hydrogen, an alkyl radical having from about 1-12 carbon atoms or $-CH_2-CH_2-OH$. The benzotriazolic compound is used in an amount varying between about 1 and 50% based on the weight of fire-retardant agent.

According to another embodiment of the present invention, there has been provided a fire-retardant composition for use in combination with polystyrenic resins, said composition containing a halogenated organic fire-retardant agent and a benzotriazolic compound having the above formula.

Other objects, features and advantages of the present invention will become apparent from the detailed description of preferred embodiments which follows.

DETAILED DESCRIPTION OF PREFERRED EMBODIMENTS

"Polystyrenic resins" include not only styrene homopolymers, such as crystalline polystyrene, but also styrene-based copolymers containing a major amount of styrene, such as ABS resins, SAN resins and high impact polystyrenes containing an elastomer, such as rubber, in an amount which may reach as much as about 15% by weight. The invention applies also to expanded polystyrene, which may be produced either by molding expandable polystyrene beads or by extruding mixtures of polystyrene and a foaming agent.

The flame-retardant agent is a halogenated organic compound, more particularly a brominated and/or chlorinated organic compound. These halogenated compounds are generally used in an amount such that the halogen content in the polystyrenic composition is at least about 0.2%. Contents higher than about 15% do not bring any advantage. More generally, the halogen content in the final polystyrenic composition lies between about 0.5 and 10% by weight. This amount depends mainly on the kind of halogenated fire-retardant agent; brominated compounds are generally more active than the corresponding chlorinated compounds and they may therefore be used in lower amounts. These agents and their use are well known in the art. Typical halogenated fire-retardant agents are acetylene tetrabromide, dibromotetrachloroethane, tetrachloroethane, pentachloroethane, hexachloro- or hexabromobenzene, tetrabromobutane, polyhalobiphenyls, polyhalobiphenylethers, perhalopentacyclododecanes, pentabromomonochlorocyclohexane, solid or liquid chlorinated paraffins and the like and mixtures thereof.

The synergistic compounds of the present invention are benzotriazolic compounds having the above formula. These compounds are generally used in an amount which may vary between about 1 and 50% by weight, based on the amount of halogenated fire-retardant agent. This amount depends on the kind of fire-retardant agent and on the kind of benzotriazolic compound. In most cases, the synergistic compound is used in an amount which lies between about 0.01 and 5% by weight, more particularly between about 0.02 and 2%, based on the weight of polystyrenic resin. The choice of the benzotriazolic compound depends mainly on its price and on its availability. By way of illustration and not of limitation, benzotriazolic compounds which are advantageously used include benzotriazole, tolutriazole, $N^3$-decylbenzotriazole and other $N^3$-substituted benzotriazoles.

Some fire-retardant agents, more particularly the agents which possess a high thermal stability, are advantageously used in admixture with antimony oxide. It has been found that the amount of antimony oxide to be added may be decreased by about 50% below that conventionally employed without detrimental effect on the fire-retardant properties or on the thermal stability of the final polystyrenic composition when a benzotriazolic compound is incorporated as a synergistic compound into the composition. The amount of antimony oxide—when used—does not generally exceed about 7% by weight of the polystyrenic resin. This amount depends on the kind and amount of fire-retardant agent, and it may vary generally between about 2 and 5%. With other fire-retardant agents, more particularly with halogenated aliphatic compounds, the use of antimony oxide is not required.

The following examples are provided to illustrate the features of the present invention without in any manner limiting the invention.

The self-extinguishing properties of the polystyrenic compositions are determined with the use of specimens measuring $15.23 \times 1.27 \times 0.32$ cm, according to the following test:

Each specimen is hung, the largest dimension being vertical and the distance between the lower end of the specimen and the upper end of the burner being 0.95 cm. The burner is lighted and the flame has a height of 1.9 cm. Air is premixed with the gas in order to avoid any yellow tip at the top of the flame. This flame is disposed under the lower end of the specimen for a period of 10 seconds. The burner is then removed and the flaming combustion time is measured. Immediately after extinction, the flame is again disposed under the specimen for a period of 10 seconds. The burner is then removed and the flaming combustion time is again measured. The data given in the examples are the averages of 20 successive tests (10 specimens and 2 determinations for each specimen). In case of foamed polystyrene, the same procedure is used, but the flame is disposed under the specimen only 1 time and for a period of 3 seconds.

Unless otherwise expressed, the weight percentages are based on the weight of polystyrenic resin.

EXAMPLE 1

Four compositions are prepared from crystal polystyrene, 0.05% di-tert-butylhydroxytoluene (or BHT), 0.035% zinc stearate, 0.75% pentabromomonochlorocyclohexane (as fire-retardant agent) and 0.20% of a benzotriazolic compound having the above formula and which is respectively:

| Composition A: | $R_1 = H$ | $R_2 = H$ |
| --- | --- | --- |
| Composition B: | $R_1 = CH_3$ | $R_2 = H$ |
| Composition C: | $R_1 = H$ | $R_2 = -CH_2N(R_3)_2$ with $R_3 = -C_{10}H_{21}$ |
| Composition D: | $R_1 = H$ | $R_2 = -CH_2N(R_3)_2$ with $R_3 = -CH_2-CH_2OH$ |

The flaming combustion times (in seconds) are respectively:
 Composition A: 1.60
 Composition B: 1.02
 Composition C: 0.51
 Composition D: 0.53

A similar composition but without the benzotriazolic compound has a flaming combustion time of 11.71 seconds.

EXAMPLE 2

Compositions are prepared from crystal polystyrene, 0.95% BHT, 0.035% of zinc stearate, and 0.75% fire-retardant agent. 0.20% of benzotriazole is also added to some compositions.

The fire-retardant agents and the flaming combustion times, are respectively:

| Fire-retardant agent | Flaming combustion time (in seconds) | |
| --- | --- | --- |
| | Without benzotriazole | With benzotriazole |
| Acetylene tetrabromide | 8.21 | 2.44 |
| Dibromotetrachloroethane | 15.75 | 3.19 |
| Tetrachloroethane | > 60 | 17.01 |

EXAMPLE 3

A composition is prepared from crystal polystyrene, 0.05% BHT, 0.035% zinc stearate, 3.75% pentabromomonochlorocyclohexane and 1.75% benzotriazole.

The flaming combustion time is 0.42 seconds.

EXAMPLE 4

Compositions are prepared from high-impact polystyrene (containing 5% rubber), 10% of one of the following fire-retardant agents and 5% antimony oxide.

2% benzotriazole is also added to some compositions. The results are:

| Fire-retardant agent | Flaming combustion time (in seconds) | |
| --- | --- | --- |
| | Without benzotriazole | With benzotriazole |
| Hexabromobenzene | 8.74 | 2.07 |
| Decabromobiphenyl | 0.93 | 0.51 |
| Decabromobiphenylether | 1.95 | 0.86 |
| Perchloropentacyclododecane | 22.61 | 7.58 |
| Hexabromocyclododecane | 2.47 | 1.12 |

EXAMPLE 5

Multicellular plates are injection molded from expandable polystyrene beads containing pentane as the foaming agent.

1.5% of pentabromomonochlorocyclohexane and 0.2% of a benzotriazolic compound having the above general formula where $R_1 = H$ and $R_2 = -CH_2N(C_{10}H_{21})_2$ are added to the beads.

The flaming combustion time is 8.0 seconds.

A similar composition, but without benzotriazolic compound, is also molded. The flaming combustion time is 17.0 seconds.

EXAMPLE 6

A composition is prepared from crystal polystyrene, 5% chlorinated paraffin (average of 25 carbon atoms and chlorine content=70%), 0.1% BHT, 0.035% zinc stearate and 0.2% benzotriazole.

The flaming combustion time is 22.43 seconds.

A similar composition but without benzotriazole has a flaming combustion time higher than 60 seconds.

EXAMPLE 7

A combustion is prepared from an ABS resin (containing 7% butadiene and 17% acrylonitrile), 12% decabromodiphenyloxide, 5% $Sb_2O_3$ and 2% of a benzotriazolic compound having the above formula where $R_1$ is H, and $R_2$ is $-CH_2N(C_{10}H_{21})_2$.

The flaming combustion time is 1.23 seconds.

A similar combustion but without the benzotriazolic compound has a flaming combustion time of 3.48 seconds.

What is claimed is:

1. A self-extinguishing polystyrenic composition comprising a polystyrenic resin, a fire-retardant amount of a halogenated organic fire-retardant agent and a benzotriazolic compound having the formula

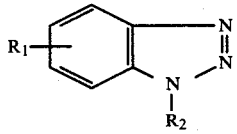

wherein $R_1$ is H or —$CH_3$ and $R_2$ is H or —$CH_2N(R_3)_2$ wherein $R_3$ is H, an alkyl radical containing from about 1 to 12 carbon atoms or —$CH_2 CH_2 OH$, in an amount between about 1 and 50% of the weight of said fire-retardant agent.

2. The composition of claim 1, wherein said benzotriazolic compound is used in an amount between about 0.01 and 5% by weight of polystyrenic resin.

3. The composition of claim 2, wherein the amount of benzotriazolic compound is between about 0.02 and 2% by weight of polystyrenic resin.

4. The composition of claim 1, further comprising antimony oxide in an amount which does not exceed about 7% by weight of the polystyrenic resin.

5. The composition of claim 4, wherein the amount of antimony oxide is between about 2 and 5% by weight of the polystyrenic resin.

6. The composition of claim 1, wherein the polystyrenic resin comprises homopolystyrene or a styrene copolymer containing a major amount of styrene.

7. The composition of claim 6, wherein said styrene copolymer comprises an ABS copolymer, a SAN copolymer or a rubber-modified polystyrene.

8. The composition of claim 1, wherein the polystyrenic resin comprises an expanded resin.

9. The composition of claim 1, wherein said fire-retardant agent is acetylene tetrabromide, dibromotetrachloroethane, tetrachloroethane, pentachloroethane, hexachloro- or hexabromobenzene, tetrabromobutane, polyhalobiphenyls, polyhalobiphenylethers, perhalopentacyclododecanes, pentabromomonochlorocyclohexane, a chlorinated paraffin or a mixture thereof.

10. The composition of claim 1, wherein said benzotriazolic compound is selected from those wherein

| $R_1$ = H   | and | $R_2$ = H; |
| $R_1$ = $CH_3$ | and | $R_2$ = H; |
| $R_1$ = H   | and | $R_2$ = $CH_2N(C_{10}H_{21})_2$; or |
| $R_1$ = H   | and | $R_2$ = $CH_2N(CH_2CH_2OH)_2$. |

11. A fire-retardant composition for use in combination with polystyrenic resins, comprising a halogenated organic fire-retardant agent and a benzotriazolic compound having the formula

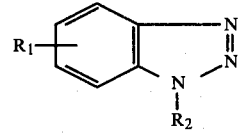

wherein $R_1$ is H or —$CH_3$ and $R_2$ is H or —$CH_2N(R_3)_2$, wherein $R_3$ is H, an alkyl radical containing from about 1 to 12 carbon atoms or —$CH_2 CH_2 OH$, in an amount between about 1 and 50% of the weight of said fire-retardant agent.

* * * * *